United States Patent [19]

Kleysen

[11] Patent Number: 5,393,084
[45] Date of Patent: Feb. 28, 1995

[54] SWIVEL BUNKED DOUBLE TRAILERS FOR CONTAINERS

[76] Inventor: Hubert T. Kleysen, 2100 McGillivray Blvd., Winnipeg, MB, Canada, R3T 3N5

[21] Appl. No.: 83,887

[22] Filed: Jun. 28, 1993

[51] Int. Cl.$^6$ .............................................. B62D 13/00
[52] U.S. Cl. ..................................... 280/442; 280/426
[58] Field of Search ................ 280/476.1, 426, 442, 280/400, 405.1

[56] References Cited

U.S. PATENT DOCUMENTS

| | | | |
|---|---|---|---|
| 1,073,339 | 9/1913 | Forthmann | 280/442 |
| 3,312,479 | 4/1967 | Cunha | 280/476.1 X |
| 3,591,203 | 7/1971 | Steiner | 280/426 |
| 4,244,596 | 1/1981 | Chung | 280/442 X |
| 4,930,800 | 6/1990 | Jean-Luc | 280/476.1 X |
| 5,171,035 | 12/1992 | Brown | 280/442 |

FOREIGN PATENT DOCUMENTS 1190574 7/1985 Canada .

Primary Examiner—Karin L. Tyson
Assistant Examiner—Carla Mattix
Attorney, Agent, or Firm—Robert W. B. Bailey

[57] ABSTRACT

A double lead-pup trailer assembly for container transport has swivel bunks enabling the container to be carried on the articulated trailers. The rear swivel bunk slides rotatably within a slot extending to the rear of the pup trailer allowing the container to be directly unloaded. The coupling means between the trailers is adjustable between a highway articulated driving relationship, and a backing up aligned relationship. One advantage is the gross vehicle weight and payload are improved. Another advantage is that the container more closely tracks the tractor and trailer wheels on turns, thus providing more manoeuvrability and safety.

13 Claims, 8 Drawing Sheets

SWIVEL BUNKED DOUBLE TRAILERS FOR CONTAINERS

This invention is directed to bunked trailers for transporting containers, and new and useful improvements therein, primarily the bunked trailers are designed for use as double trailer assemblies.

The present invention primarily relates to semitrailers incorporating swivel container bunks, and double trailer assemblies incorporating the semitrailers, to provide a container transport system of significantly enhanced carrying capacity. The trailers are modified to incorporate permanent swivel container bunks without increasing trailer height. The present invention secondarily provides ancillary articulating, sliding and locking features incorporated into lead and pup semitrailers to facilitate articulation and loading of trailers and container. Although the invention will be described and referred to as it relates to semitrailers incorporating swivel container bunks, and double trailer assemblies incorporating these, together with ancillary features, it will be understood that the principles of this invention are equally applicable to similar vehicles and assemblies thereof and accordingly, it will be understood that the invention is not limited to such trailers and assemblies thereof.

BACKGROUND OF THE INVENTION AND PRIOR ART

Containers are practically restricted worldwide by generally available handling techniques to typically 85,000 to 90,000 lbs gross weight. The standard container box is 9 ft. 6 in. high, 8 ft. 6 in. wide and 40, 48 or 53 feet long.

The container box is usually transported by road, on a tandem (two axle) or tridem (three axle) semitrailer hauled by a tractor rig (three axle). Allowable gross vehicle weight varies considerably by regulating authority.

Illustrative of such restrictions in North American states or provinces, generally 74,000 to 80,000 lbs sometimes 87,000 lbs (39,500 Kg) gross vehicle weight is allowed for a tandem trailer rig. When a tridem trailer is used, gross vehicle weight may be as much as 100,000 lbs (45,500 Kg), but not all regulating authorities allow heavier loading of tridem trailers, which may be restricted to as little as 74,000 lbs gross vehicle weight. The maximum gross load is thus 100,000 lbs, with maximum net payload say to 60,000 to 65,000 lbs, but may be considerably less. Fully loaded containers as noted above typically weigh 85,000 to 90,000 lbs, and cannot be economically transported by road, and in fact have to be partly unloaded.

There is therefore a need for improved more economic methods and systems of transporting fully loaded containers, which comply effectively with as many North American regulations as possible. Such methods and systems would also be widely applicable in other jurisdictions.

Containers can accommodate considerably more than 60,000 to 65,000 lbs of cargo, which represents massive underutilization of carrying capacity. A further practical restriction is that the semitrailer must stand about 47 or 48 inches above ground or highway level, to accommodate the wheel assemblies. The maximum regulated height of the loaded semitrailer is 13 ft. 6 in., in North America. Although the bed of the trailer could be lowered forward of the rear wheel assembly, this would prevent easy access to the container interior from a loading dock.

To place the container on a double trailer assembly, including lead and pup tandem trailers with articulated coupling, would increase maximum gross vehicle weight to some 125,000 lbs (56,500 Kg), and the maximum payload to some 90,000 lbs. This would represent an increase of some 25,000 to 30,000 lbs in carrying capacity or 40 to 50% increase in round figures. It is possible that use of a tridem lead trailer, would allow a maximum gross vehicle weight of some 138,000 lbs (62,500 Kg), and an even greater increase in carrying capacity. Thus far containers have been typically transported on a single trailer hauled by a rig.

Canadian Patent 1190574, issued Jul. 16, 1985, to Kleysen, teaches to carry elongate loads on conventional unmodified lead trailer pup trailer combinations, using removable swivel bunks. One swivel bunk, in normal practice the rear bunk installed on the pup trailer, is a sliding swivel bunk. Its cradle is mounted on a pivot pin. The pivot pin is slidably as well as rotationally mounted in a slot in its support allowing longitudinal motion of the cradle with respect to the support and the trailer. This conformation allows use of articulated double conventional trailers to carry a single elongate load, without undue cornering problems. The limited sliding movement of the rear swivel bunk support point on the rear pup trailer, allows the elongate load to conform as closely as possible to the tracking of the trailer wheels which follow the tractor rig wheel rack around corners.

There are three basic types of double semitrailer combinations. One is fifth wheel coupling trailer to trailer, where the fifth wheel is mounted on the lead trailer. Another is a single drawbar converter dolly coupling trailer to trailer, where the dolly is mounted beneath the pup trailer. The third is a double drawbar converter dolly coupling trailer to trailer, where the dolly is again mounted beneath the pup trailer.

It is a principal object of the invention to provide improved transport weight capacity for elongate loads, particularly containers, utilizing articulated lead pup trailer combinations. It is a subordinate object of the invention to provide such combinations, using but not restricted to fifth wheel, single drawbar converter doily, and double drawbar converter doily couplings. It is another object of the invention to provide swivel bunks on both trailers engaging the container to allow easier tracking and manoeuvring of the container double trailer combination around corners. This is a significant advantage as it makes the container double trailer combination much more manoeuvrable in city streets, where often space is very restricted. It is a further object of the invention to provide bunks integral to the trailers. It is a further object of the invention to provide a sliding swivel bunk, enabling the container to be unloaded in place on the trailer combination. It is a further object of the invention to provide means to lock the trailers in relative position. It is a further subsidiary object of the invention to provide means to lock the trailers in articulatory relationship, for highway driving. It is a further subsidiary object of the invention to provided means to lock the trailers in aligned longitudinal relationship, for backing up the combination. It is a further subordinate object to provide shortening of the double trailer combination in aligned longitudinal relationship. The locking and shortening makes for ease of backing up and unloading. It is a further subordinate object that when in aligned relationship, the rear of the container coincides with or projects beyond the rear of the pup trailer. It is a further subordinate object that the modified semitrailers of the invention comply as fully as possible with and be usable under the broadest possible range of applicable transport regulations.

To achieve this the loaded trailer train must be able to articulate, and the semitrailer height preferably must not exceed 48 inches otherwise the top of the container will exceed the 13 ft. 6 in. regulated height restriction.

DESCRIPTION OF THE INVENTION

The invention in one broad aspect is directed to a double trailer assembly for transporting elongate load means, particularly including container means. Lead trailer means are articulated to pup trailer means. There are front fixed swivel bunk means integral to the lead trailer means having front cradle means for supporting one end of the elongate load means. The front cradle means is rotationally mounted about a vertical axis passing through its midpoint. There is front support means for rotationally mounting the front cradle means. There are rear slidable swivel bunk means integral to the pup trailer means having rear cradle means for supporting another end of the elongate load means. The rear cradle means is rotationally mounted about a vertical axis passing through its midpoint, and slidably mounted for movement forwardly and rearwardly of the pup trailer. There are rear support means for rotationally mounting the rear cradle means, which are slidably mounted in the pup trailer means. The rear cradle means is slidable from a first forward position to a second rear position abutting the rear end of the pup trailer means. Preferably there are conventional articulating means on the lead trailer means coupled to the pup trailer means by movable coupling means. This coupling means is movable between first forward position relative to the pup trailer means and second rearward position relative to the pup trailer means. Locking means associated with the movable coupling means enable locking the movable coupling means in the first and second positions. The trailer assembly is articulatable in the first position, and fixedly longitudinally aligned in the second position.

Preferably the front cradle means has horizontal arm means terminating in means to engage container tiedown point means, and similarly the rear cradle means has horizontal arm means terminating in means to engage container tiedown point means. Suitably the rear cradle means includes rear circular cradle plate means beneath the arm means. Advantageously the rear support means includes paired opposed rear rectangular support plate means and rear central slot means extending longitudinally between the paired opposed rear support plate means. The rear slot means is additionally defined by opposed wall means dependent from the paired opposed rear support plate means. Bushing means slidably and rotationally contacting both the rear slot wall means. and engage rear cradle shaft means extending beneath the rear circular cradle plate means.

The articulating means on the lead trailer means may include fifth wheel means. The moveable coupling means preferably include kingpin means in the pup trailer means slidable in channel means between the first forward position and the second rear position. The lead trailer means conveniently has recess means to matingly engage front base means of the pup trailer means when the kingpin means is in second position.

The articulating means on the lead trailer means may include hitch means. The moveable coupling means can be single drawbar means, with telescopic pole means slidable between the first forward position and the second rear position. In which case the lead trailer means has recess means to matingly engage the single drawbar means, in the second position.

Alternatively the hitch means may be double, with the moveable coupling means including double drawbar means having paired telescopic pole means slidable between the first forward position and the second rear position.

Regardless of articulation mode, container means may be engaged by tiedown points by the means to engage container tiedown point means terminal to the cradle arm means.

In another broad aspect the invention is directed to a lead trailer for a double trailer assembly for transporting elongate load means, particularly including container means. The lead trailer has integral front fixed swivel bunk means, with front cradle means for supporting one end of the elongate load means. The front cradle means is rotationally mounted about a vertical axis passing through its midpoint. There is front support means for rotationally mounting the front cradle means.

Preferably the front cradle means has horizontal arm means terminating in means to engage container tiedown point means. Conveniently fifth wheel means are provided to couple pup trailer means, together with recess means to matingly engage front base means of the pup trailer means.

Similarly hitch means to couple single drawbar means of pup trailer means, and recess means to matingly engage the single drawbar means, may be provided.

Alternatively hitch means to couple double drawbar means of pup trailer means, may be provided.

In a further broad aspect the invention is directed to a pup trailer for a double trailer assembly for transporting elongate load means, particularly including container means. The pup trailer has integral rear slidable swivel bunk means with rear cradle means for supporting another end of the elongate load means. The rear cradle means is rotationally mounted about a vertical axis passing through its midpoint, and slidably mounted for movement forwardly and rearwardly of the pup trailer. Rear support means for rotationally mounting the rear cradle means, are slidably mounted in the pup trailer means. The rear cradle means is slidable from a first forward position to a second rear position abutting the rear end of the pup trailer means.

Additionally movable coupling means for lead trailer means, may be on the pup trailer. The coupling means is movable between first forward position relative to the pup trailer means and second rearward position relative to the pup trailer means. Locking means associated with the movable coupling means to lock the movable coupling means in the first and second positions.

Preferably the rear cradle means has horizontal arm means terminating in means to engage container tiedown point means, and includes rear circular cradle plate means beneath the arm means, the rear support means including paired opposed rear rectangular support plate means and rear central slot means extending longitudinally between the paired opposed rear support plate means. The rear slot means is additionally defined by opposed wall means dependent from the paired opposed rear support plate means. Bushing means slidably and rotationally contacting both the rear slot wall means, engage rear cradle shaft means extending beneath rear circular cradle plate means.

In one version the moveable coupling means includes kingpin means slidable in channel means between the first forward position and the second rear position. In another the moveable coupling means comprises single drawbar means, having telescopic pole means slidable between the first forward position and the second rear position. In a third version the moveable coupling means comprises double drawbar means having paired telescopic pole means slidable between the first forward position and the second rear position.

The cradle means typically has locking bolster means to engage container tiedown point means. Circular lubricating plastic layer means beneath the front and rear circular cradle plate means provide effective lubrication, resting on the front circular and rear rectangular support plate means.

Pup trailer kingpin means may be slidably mounted in central channel means, which is defined by opposed horizontal spaced apart longitudinal support wall means having slot means therebetween. Opposed vertical spaced apart guide wall means may be provided parallel and outward of the slot means. Slide means within the channel means extending between the guide wall means, have kingpin means mounted therein, extending through and below the slot means. The slide means are slidable between first forward position and second rearward position. First locking means to engage the slide in first position and second locking means to engage the slide means in second position are provided. These first and second locking means may be separate pin means movable between first retracted and second extended position, the pins in extended position engaging paired opposed bushing means in the guide walls and intervening bushing means in the slide means, whereby the kingpin may be locked alternately in first or second position and slid therebetween.

Locking recess means on the lead trailer means may be provided having opposed spaced apart lug means forming recess means at the height of the front of the pup trailer means. These recess means matingly engage the front of the pup trailer means when in full contact. These lug means are suitably mounted on girder means at the height of the pup trailer and may have interior vertical surfaces transverse and longitudinal of the lead trailer means. Preferably vertical rearward surfaces angled outward from the longitudinal surfaces serve as guide means for the front of the pup trailer chassis means.

Suitably the lead trailer means has rear fifth wheel coupling means to engage kingpin means on pup trailer means, the fifth wheel coupling means being mounted rearward of the rearmost axle of the trailer means.

BRIEF DESCRIPTION OF THE DRAWINGS

Preferred embodiments are illustrated in the drawings where.

DESCRIPTION OF THE PREFERRED EMBODIMENTS

Figure 1:
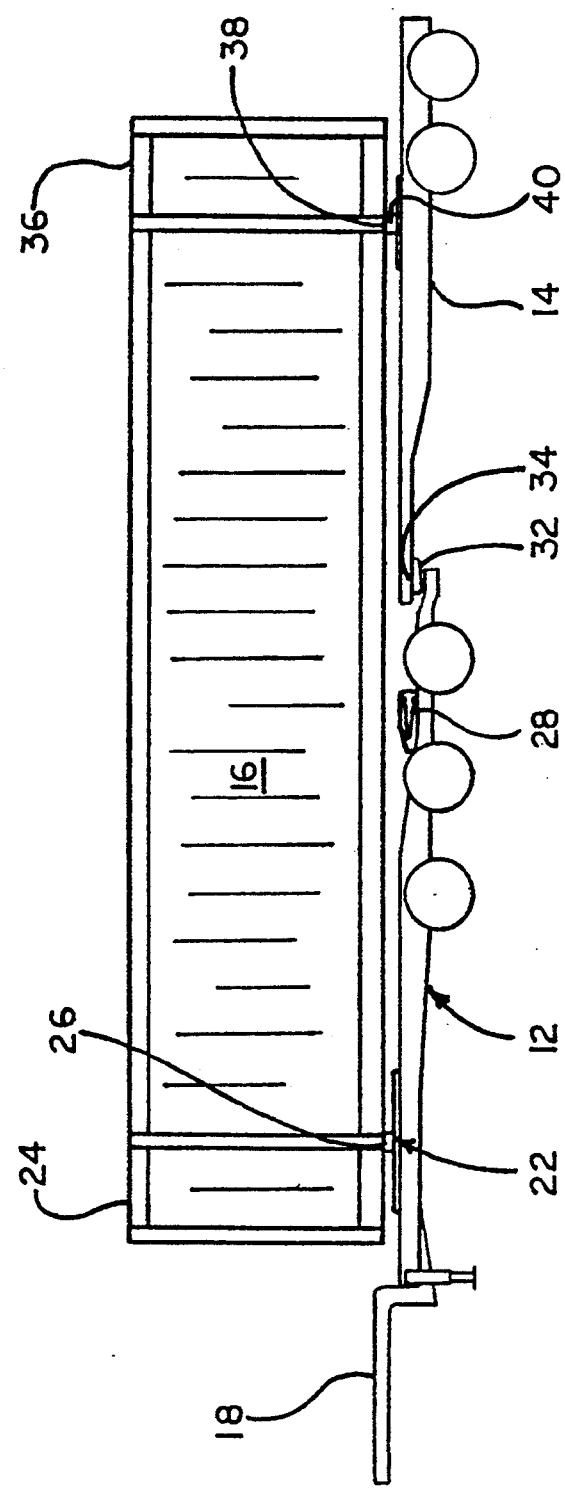
FIG. 1 is a schematic side elevational view of an embodiment of the invention showing a conventional tractor rig and modified double semitrailer assembly, together with a container.
Figure 2:
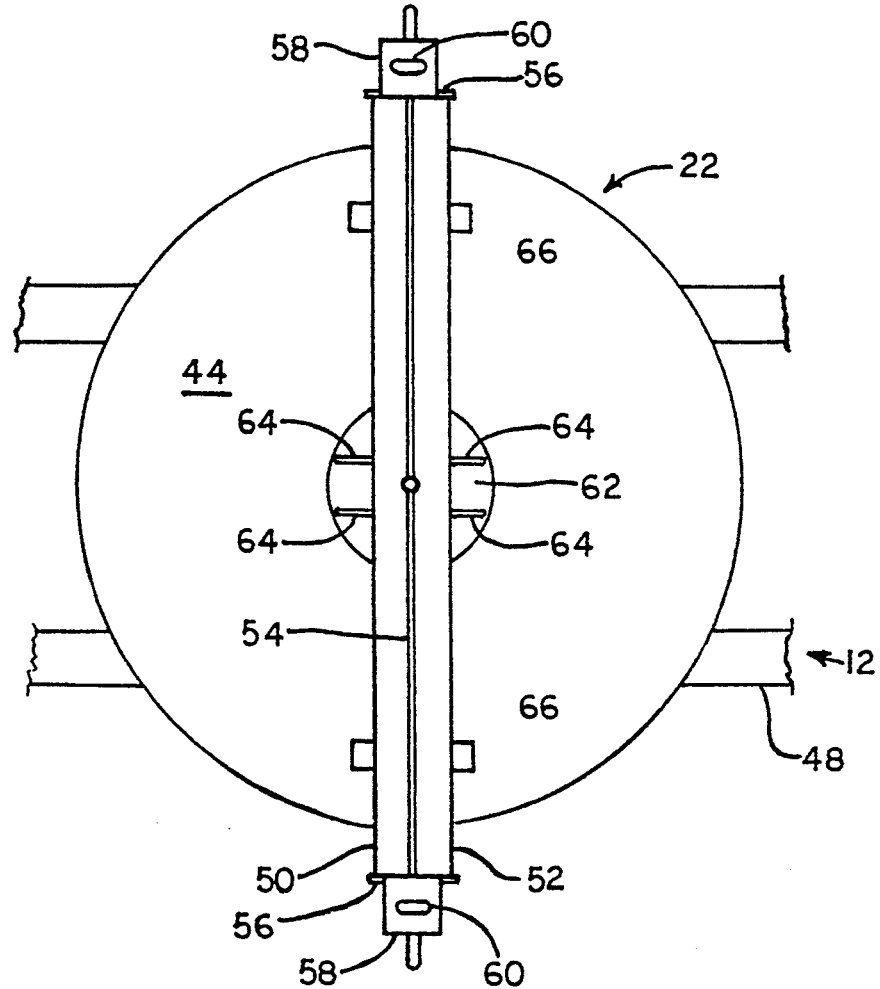
FIG. 2. shows a top view of a swivel bunk embodiment of a lead trailer of the invention.
Figure 3:
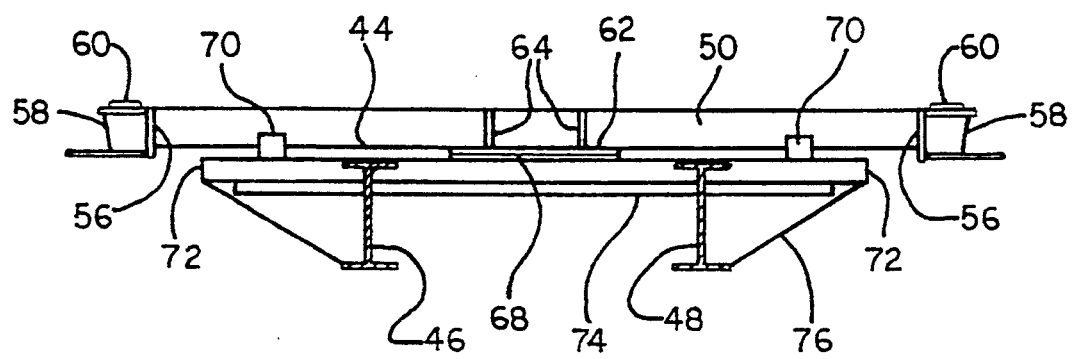
FIG. 3 shows a front view of the embodiment of FIG. 2.
Figure 4:
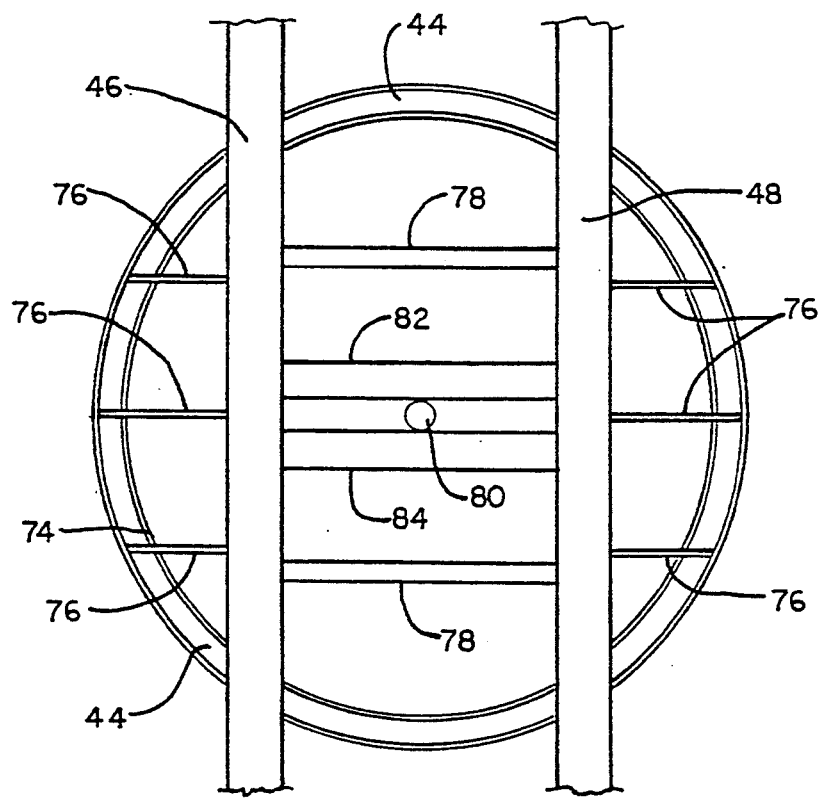
FIG. 4 shows a bottom view of the embodiment of FIG. 2.

The general description of the invention is now expanded by reference to the drawings, which illustrate preferred embodiments of the invention.

In the drawings numeral 10 indicates a conventional three axle ten wheel tractor rig hauling modified lead trailer 12 and modified pup trailer 14 carrying container 16. Modified lead trailer 12 has goose neck 18, bearing fifth wheel coupling 20 engaging tractor rig 10. The depicted version is a tandem semitrailer, although as those skilled in the art would be aware a similarly modified tridem trailer could be used. Front swivel bunk 22 supports front end 24 of container 16 engaging conventional tiedown or lifting points 26. Lugs 28 are adapted to matingly engage the front end 30 of pup trailer 14, fifth wheel coupling 32 engages sliding kingpin 34 of pup trailer 14. Rear end 36 of container 16 is supported by sliding swivel bunk 38 at conventional tiedown or lifting points 40. Front swivel bunk 22 has cradle 42 supported by circular planar support plate itself supported by parallel longitudinal frame I beam girders 46 and 48 of trailer 12. Cradle 42 includes paired square tubes 50 and 52, each ⅜ inch thick by 4 inches square, welded to reinforcing flat bar 54 ½ inch by 4 inch, at each end of cradle 42 are transverse plates 56, to which are welded conventional locking bolster assemblies 58, including locking lugs 60 which engage conventional tiedown or lifting points 26 of container 16. Support disk 62, ¼ inch thick is welded below tubes 50 and 52 and reinforcing bar 54, and further attached to tubes 50 and 52 by triangular supports 64. Auxiliary curved support plates 66, ¼ inch thick are attached to cradle 42, adjacent the outer circumference, of support 44.

Underneath support disk 62 resting on support 44 is UHMW plastic layer 68, ⅜ inch thick, forming in effect a lubricating layer. Similar plastic lubricating layers 70 underlie curved plates 66. Support 44 is reinforced by peripheral flange 72, internal concentric flange 74, and triangular reinforcements 76, which are all suitably ¼ inch steel.

Figure 15:
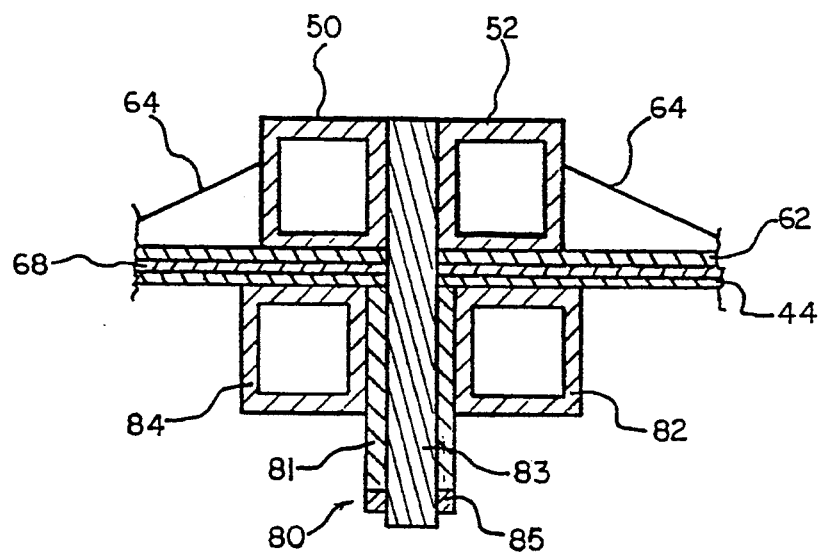
FIG. 15 shows a sectional view of the embodiment of FIG. 2.

Beneath support 44 is swivel bearing 80 which includes fixed bushing 81 welded to transverse square tubes 82 and 84, pivot pin 83, of 1½ in. precision steel, is rotationally mounted within fixed bushing 81. Pin 83 is welded to tranverse square tubes 50 and 52, washer or retaining ring 85 prevents pin 83 being displaced from bushing 81, (FIG. 15). Conventional cross plates 78 extend between and strengthen girders 46, and 48 below support 44. Girders 46 and 48 are not modified, flanges 72 and 74 are cut away to accommodate these, and welded thereto. Similarly reinforcements 76 are cut away to accommodate inner flange 74, and welded thereto.

Figure 5:
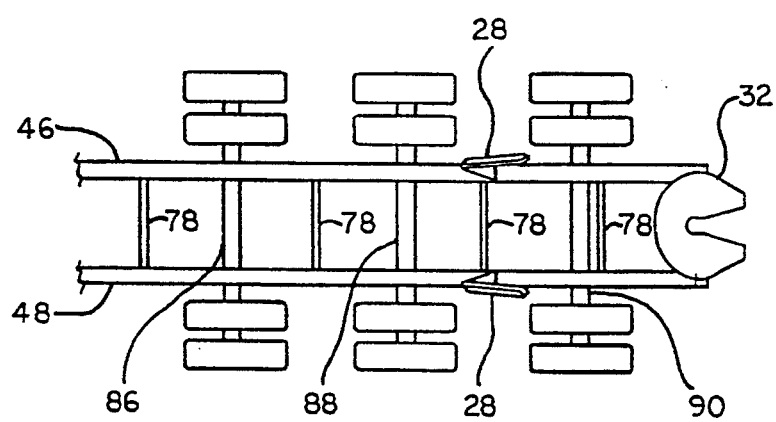
FIG. 5 shows a schematic top view of a rear portion embodiment of a lead trailer of the invention.
Figure 6:
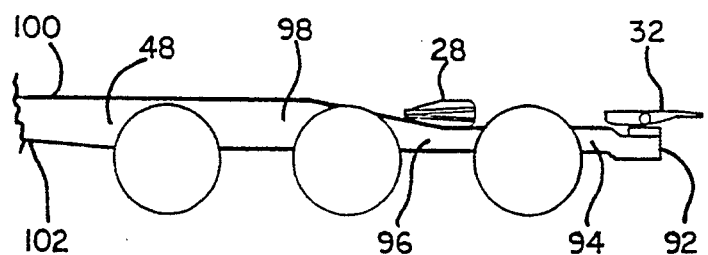
FIG. 6 shows a schematic side view of the embodiment of FIG. 5.
Figure 7:
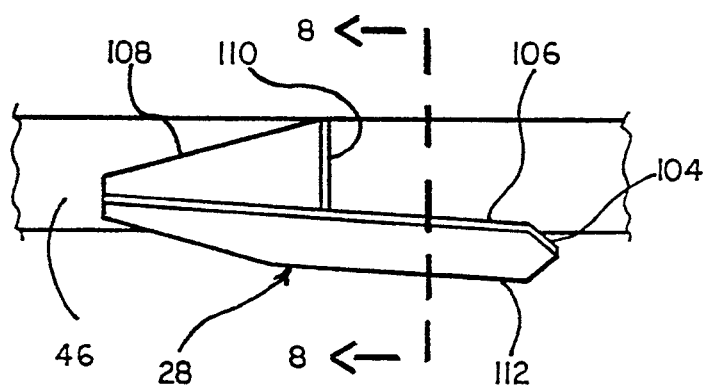
FIG. 7 shows a detail of the embodiment of FIG. 5.
Figure 8:
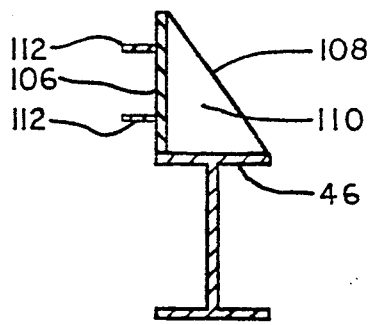
FIG. 8 shows a part sectional view of the detail of FIG. 7.
Figure 9:
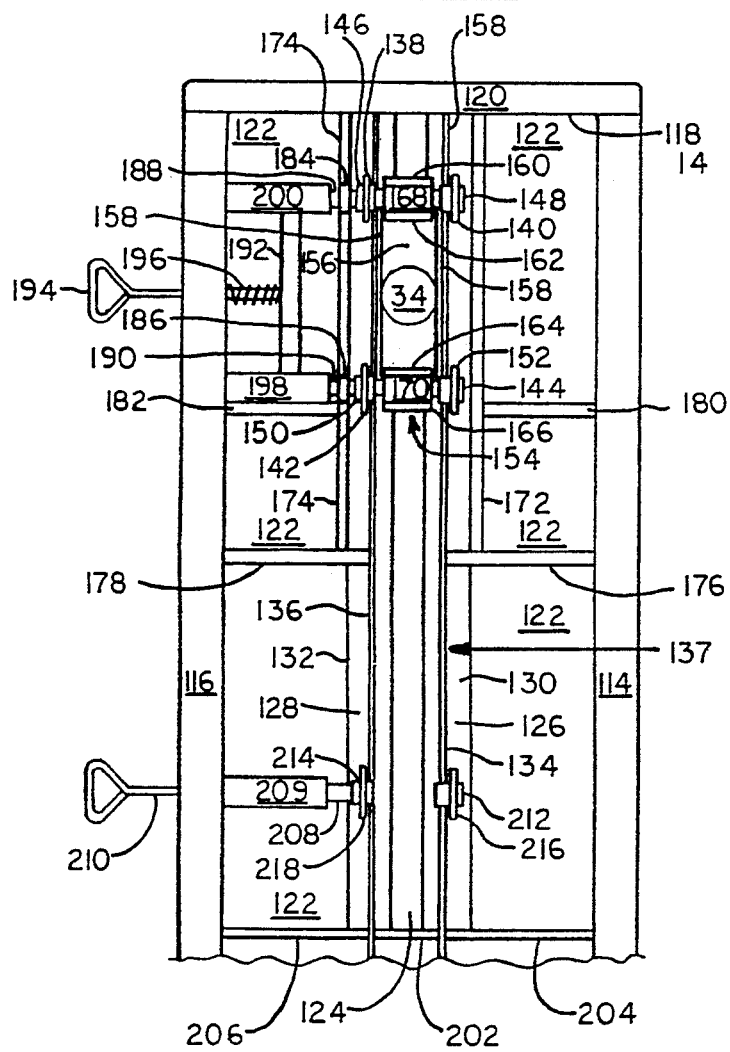
FIG. 9 shows a schematic top view of a front portion embodiment of a pup trailer of the invention.
Figure 10:
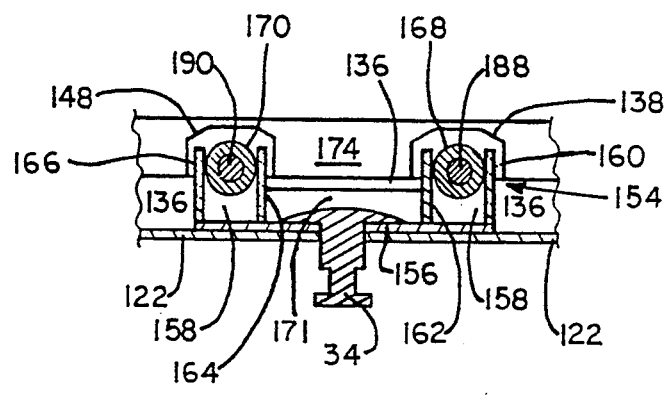
FIG. 10 shows a sectional view of a detail of FIG. 9.
Figure 11:
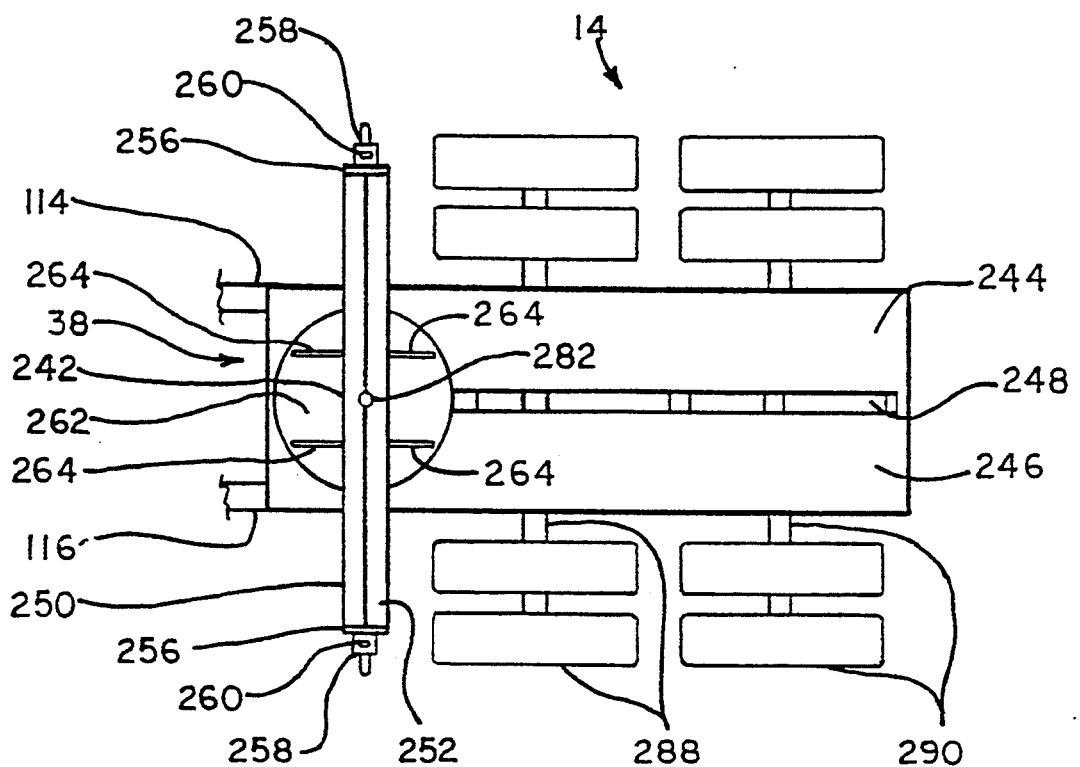
FIG. 11 shows a schematic top view of a rear portion embodiment of a pup trailer of the invention.
Figure 12:
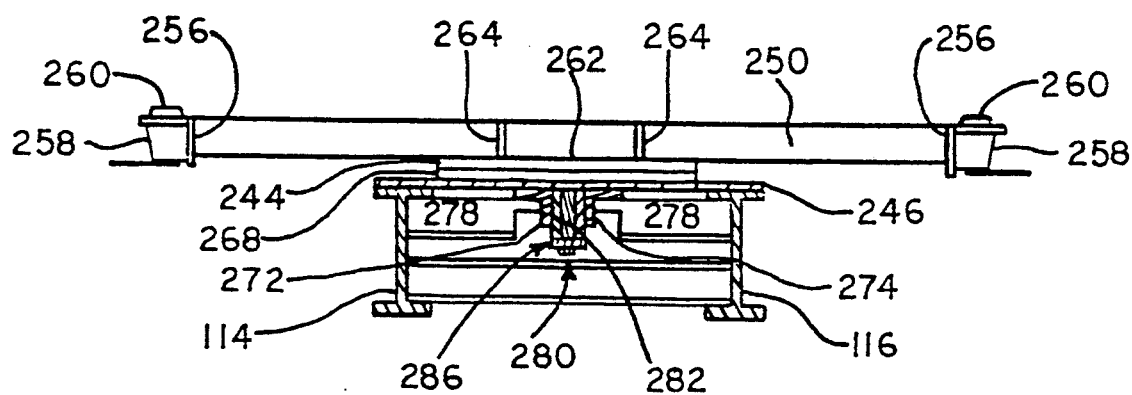
FIG. 12 shows a part sectional front view of the embodiment of FIG. 11.

The rear portion of lead trailer 12 (shown as tridem in FIG. 5) has triple axles 86, 88 and 90, fifth wheel coupling 32 is mounted rearward of rear axle 90, and lugs 28 are mounted between axles 88 and 90. I beams 48 are modified fifth wheel coupling being mounted on horizontal lower terminal portion 92, which is joined by angled portion 94, to level portion 96, forward of level portion 96 is ramped portion 98 which rises to level 100 that of the main level of lead trailer 100, the bottom of ramped portion 102 similarly rises. Lugs 28 are placed at the angle join of portions 96 and 98.

Lugs 28 as shown on girder 46 includes angled vertical flange 104, longitudinal vertical flange 106 and metal tetrahedral wedge 108, forming triangular face 110 at right angles to vertical flange 106 and the horizontal surface of girder 46, reinforcing strips 112 are welded to flanges 104, 106 and wedge 108.

The front end of pup trailer 14, includes parallel I beam girders 114 and 116, joined by cross front wall 118 having top flange 120, bottom metal sheet or plate 122 extends between girders 114 and 116 extending to cross wall 118. Slot 124 extends centrally of bottom plate 122 equidistant from girders 114 and 116, guides are formed by angle irons 126 and 128, having bottom flanges 130 and 132 resting on and welded to bottom plate 122, and upright flanges 134 and 136 forming slot guide walls and channel 137. At the forward end of slot 124 are four upright plates welded to and extending above the slot guide walls are four metal plates 138, 140, 142 and 144, containing bushings 146, 148, 150 and 152. The bushings are in opposed pairs enabling 1½ inch pins to register therein. Inside channel 137 is kingpin slide 154, this has floor wall 156 and opposed side walls 158, cross walls 160, 162, 164 and 166 support bushings 168 and 170 which can register as shown with pins passing through opposed aligned bushings 146 and 148, and 150 and 152. The top of kingpin 34 extends above floor wall 156. Longitudinal wall members 172 and 174 extend outside channel 137 from front wall 118 to cross wall members 176 and 178, intermediate cross wall members 182 and 180 further brace longitudinal wall members 176 and 178. Set in wall member 174 are bushings 184 and 186, accommodating pins 188 and 190. Pin 188 is shown registering with bushings 184, 146, 168 and 148, while pin 190 is shown registering with bushings 186, 150, 170 and 152. Pins 188 and 190 are connected by control bar 192 which is controlled by removable control lever 194 and spring 196 which urges control bar 192 into contact with wall member 174. The ends of control bar 192 slide in U channels 198 and 200. Pins 188 and 190 when registered through bushings 168 and 170 maintain slide 154 and its associated kingpin 34 in position. To allow the slide to move control lever 194 is used to pull control bar 192 outward drawing pins 188 and 190 from bushings 168 and 170. Kingpin slide 34 can then be moved. Typically it is slid down channel 137 until it reaches stop 202 across channel 137, where cross walls 204 and 206 join angie iron guide walls 134 and 136. To lock slide 154 in this rear position is pin 208, slidably mounted in sleeve 209, which can be moved by removable control lever 210, to engage bushings 212 and 214 in upright members 216 and 218. Bushing 170 of slide 154 is aligned with bushings 212 and 214 thus enabling pin 208 to register therein locking slide 154 in rearward position. In practice removable control levers 194 and 210 are the same lever, being shown separately each use for convenience. Kingpin 34 thus can be moved between and locked in two distinct positions, as kingpin 34 of pup trailer 14 engages fifth wheel coupling 32 of lead trailer 12, this enables the trailers to be moved relative to each other while connected.

Modified pup trailer 14 the depicted version is a tandem semitrailer, although as those skilled in the art would be aware a similarly modified tridem trailer could be used. Rear sliding swivel bunk 38 has cradle 242 supported by horizontal paired support plates 244 and 246, which have between them central longitudinal slot 248, extending to the rear of pup trailer 12, Plates 244 and 246, rest on parallel longitudinal frame I beam girders 114 and 116 of pup trailer 14. Cradle 242 includes paired rectangular tubes 250 and 252, each ⅜ inch thick by 4 inches wide by 6 inch deep and welded each other. The rear cradle 242 is made heavier to compensate for the extra wear of sliding, which means that rear cradle 242 is deeper than front cradle 42, and that to maintain the two cradles at equal roadheights pup trailer 14 must be lower, as those skilled in the art would be aware. At each end of cradle 242 are transverse plates 256, to which are welded conventional locking bolster assemblies 258, including locking lugs 260 which engage conventional tiedown or lifting points 40 of container 16. Support disk 262, ¼ inch thick, and extending width of trailer 14 is welded below tubes 250 and 252 and further attached thereto by triangular supports 264.

Underneath support disk 262 resting on support plates 244 and 246 is UHMW plastic layer 268, ⅜ inch thick, forming in effect a lubricating layer.

Beneath support plates 244 and 246 extending into slot 248 is sliding swivel bearing 280, which includes pivot shaft pin 282 welded to tubes 250 and 252 Shaft 282 is rotatably mounted in sliding rotating bushing 284, shaft 282 has washer or retaining ring 286 to retain bushing 284 in position. Bushing 284 engages vertical flanges of angle irons 272 and 274. Support plates 244 and 246 on rest and are attached by welding to girders 114 and 116 respectively at their outer edges, and on horizontal flanges of angle irons 272 and 274 respectively at their inner edges. The two halves of conventional cross member 278, which has its centre removed to accommodate slot 248 and bearing 280, extend between girders 114 and 116 and angle irons 272 and 274. Additional lower cross member 378 is provided extending between girders 114 and 116.

Figure 13:
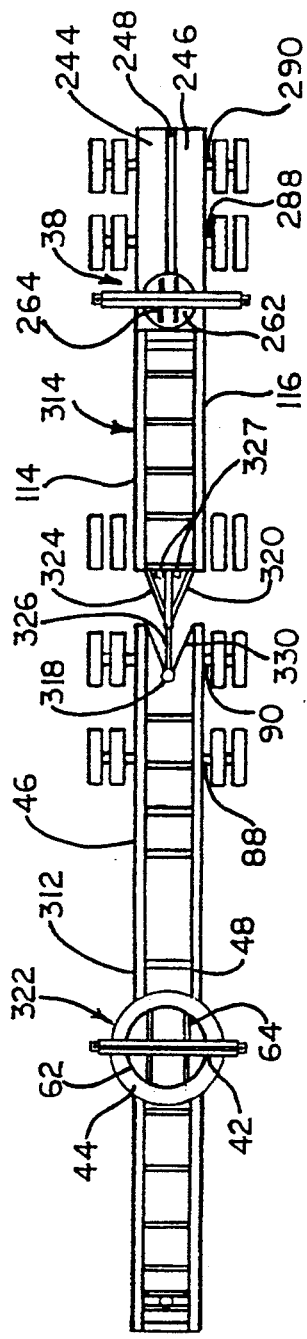
FIG. 13 shows a schematic top view of another embodiment of the invention.
Figure 14:
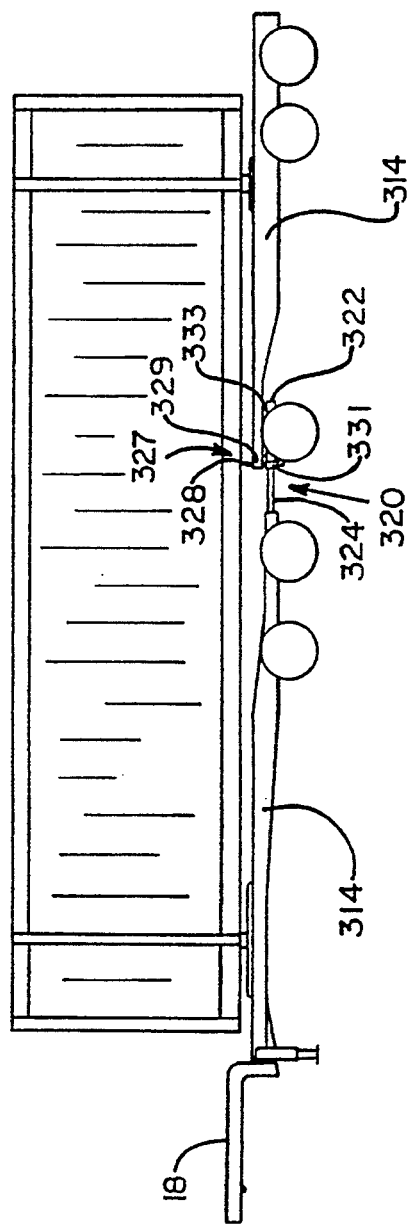
FIG. 14 shows a side view of the embodiment of FIG. 13.

In FIGS. 13, and 14, a combination of modified lead trailer 312 and pup trailer 314 joined by single drawbar coupling 315, is shown, apart from this coupling trailers 212 and 214 are identical to trailers 12 and 14, respectively. Swivel bunks 322 and 338 are identical to swivel bunks 22 and 38 respectively. Coupling 316 includes hitch 318, connected by extensible drawbar 320 to conventional converter dolly 322 rotatably mounted by western turntable 333, having an internal ball bearing race beneath trailer 314. Extensible drawbar 320 comprises rigid A frame portion 324 and retractable telescopic pole 325, which is securable in extended and retractable position by locking pins. Recess 330 is provided to receive triangular portion 324 in locking engagement. To back up the trailer combination, first converter dolly 322 is locked in position by conventional locking system 327 having pin(s) 328, upper tube(s) 329, lower tube(s) 331. Then pole locking pins removed to allow pole 326 to move with respect to portion 324, trailer 312 is backed until recess 330 contacts portion 324 in locking engagement, and the pole locking pins inserted.

Figure 16:
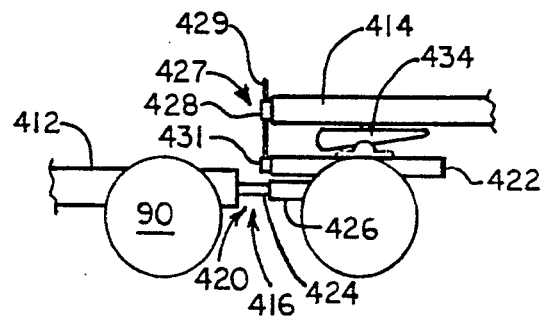
FIG. 16 shows a side view of a further embodiment of the invention.
Figure 17:
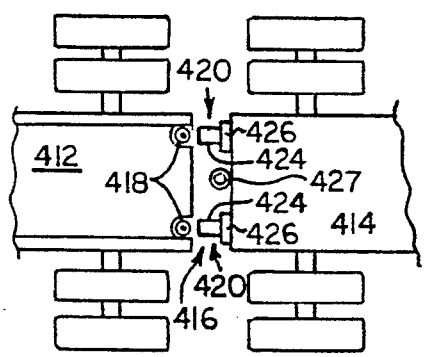
FIG. 17 shows a top view of the embodiment of FIG. 16.

In FIGS. 16, and 17, details of the coupling of modified lead trailer 412 and pup trailer 414 joined by double drawbar coupling 416, is shown, apart from this coupling trailers 212 and 214 are identical to trailers 12 and 14, respectively. Coupling 416 includes hitches 418, connected by extensible drawbars 420 to conventional converter doily 422 rotatably mounted by fifth wheel coupling 433 beneath trailer 414. Extensible drawbars 420 comprise rigid tubes 424 beneath doily 422, and retractable telescopic poles 426, which is securable in extended and retractable position by locking pins. To back up the trailer combination, first converter dolly 422 is locked in position by conventional locking system 427 having pin(s) 428, upper tube(s) 429, lower tube(s) 431. Then pole locking pins are removed to allow poles 426 to move with respect to tubes 424, trailer 412 is backed until it contacts trailer 414, and the pole locking pins inserted.

The travel path of the rear cradle axis within its slot is conveniently about 8 ft. 4 in., which has been found to accommodate lead trailer-pup trailer angles of up to 75 degrees. As those skilled in the art are aware this adequately covers most manoeuvring and driving situations, although longer slots may be utilized, without disadvantage.

As those skilled in the art would realise these preferred illustrated dimensions, details and components can be subjected to substantial variation, modification, change, alteration, and substitution without affecting or modifying the function of the illustrated embodiments. Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A double trailer assembly for transporting elongate load means, comprising lead trailer means articulated to pup trailer means, front fixed swivel bunk means integral to said lead trailer means having front cradle means for supporting one end of said elongate load means, said front cradle means being rotationally mounted about a vertical axis passing through its midpoint, front support means for rotationally mounting said front cradle means, and rear slidable swivel bunk means integral to said pup trailer means having rear cradle means for supporting another end of said elongate load means, said rear cradle means being rotationally mounted about a vertical axis passing through its midpoint, and slidably mounted for movement forwardly and rearwardly of said pup trailer, rear support means for rotationally mounting said rear cradle means, slidably mounted in said pup trailer means, said rear cradle means being slidable from a first forward position to a second rear position abutting the rear end of said pup trailer means.

2. An assembly of claim 1 comprising conventional articulating means on said lead trailer means coupled to said pup trailer means by movable coupling means, said coupling means being movable between first forward position relative to said pup trailer means and second rearward position relative to said pup trailer means, locking means associated with said movable coupling means to lock said movable coupling means in said first and second positions, said trailer assembly being articulatable in said first position, and fixedly longitudinally aligned in said second position.

3. An assembly of claim 2, wherein said front cradle means has horizontal arm means terminating in means to engage container tiedown point means, and said rear cradle means having horizontal arm means terminating in means to engage container tiedown point means,
said rear cradle means including rear circular cradle plate means beneath said arm means, said rear support means including paired opposed rear rectangular support plate means and rear central slot means extending longitudinally between said paired opposed rear support plate means, said rear slot means additionally defined by opposed wall means dependent from said paired opposed rear support plate means, bushing means slidably and rotationally contacting both said rear slot wall means, rear cradle shaft means extending beneath rear circular cradle plate means engaging said bushing means.

4. An assembly of claim 3, wherein said articulating means on said lead trailer means comprises fifth wheel means, and said moveable coupling means comprises kingpin means in said pup trailer means slidable in channel means between said first forward position and said second rear position, and said lead trailer means comprising recess means to matingly engage front base means of said pup trailer means when said kingpin means is in second position.

5. An assembly of claim 3, wherein said articulating means on said lead trailer means comprises hitch means and said moveable coupling means comprises single drawbar means, having telescopic pole means slidable between said first forward position and said second rear position, and said lead trailer means comprising recess means to matingly engage said single drawbar means, in said second position.

6. An assembly of claim 3, wherein said articulating means on said lead trailer means comprises double hitch means, and said moveable coupling means comprises double drawbar means having paired telescopic pole means slidable between said first forward position and said second rear position.

7. An assembly of claim 4, additionally comprising container means having tiedown points engaged by said means to engage container tiedown point means.

8. An assembly of claim 5 additionally comprising container means having tiedown points engaged by said means to engage container tiedown point means.

9. An assembly of claim 6 additionally comprising container means having tiedown points engaged by said means to engage container tiedown point means.

10. A pup trailer for a double trailer assembly for transporting elongate load means, said pup trailer having chassis means, comprising rear slidable swivel bunk means mounted integral to said chassis means, said bunk means having rear cradle means for supporting the rear end of said elongate load means, said rear cradle means being rotationally mounted about a vertical axis passing through its midpoint, and slidably mounted for movement forwardly and rearwardly of said pup trailer chassis means, rear support means for rotationally mounting said rear cradle means, slidably mounted in said pup trailer means, said rear cradle means being slidable from a first forward position to a second rear position abutting the rear end of said pup trailer chassis means, said pup trailer having movable coupling means for lead trailer means, said coupling means being movable between first forward position relative to said pup trailer means and second rearward position relative to said pup trailer means, locking means associated with said movable coupling means to lock said movable coupling means in said first and second positions, said rear cradle means having horizontal arm means terminating in means to engage container tiedown point means, and includes rear circular cradle plate means beneath said arm means, said rear support means including paired opposed rear rectangular support plate means and rear central slot means extending longitudinally between said paired opposed rear support plate means, said rear slot means additionally defined by opposed wall means dependent from said paired opposed rear support plate means, bushing means slidably and rotationally contacting both said rear slot wall means, rear cradle shaft means extending beneath rear circular cradle plate means engaging said bushing means.

11. A pup trailer of claim 10, wherein said moveable coupling means comprises kingpin means slidable in channel means between said first forward position and said second rear position.

12. A pup trailer of claim 10, wherein said moveable coupling means comprises single drawbar means, having telescopic pole means slidable between said first forward position and said second rear position.

13. A pup trailer of claim 10, wherein said moveable coupling means comprises double drawbar means having paired telescopic pole means slidable between said first forward position and said second rear position.

* * * * *

UNITED STATES PATENT AND TRADEMARK OFFICE
CERTIFICATE OF CORRECTION

PATENT NO. : 5,393,084
DATED : February 28, 1995
INVENTOR(S) : Kleysen

It is certified that error appears in the above-indentified patent and that said Letters Patent is hereby corrected as shown below:

Col. 2, line 47, "doily" both occurrences should read --dolly--.
Col. 6, line 50, "44," should be inserted between --plate-- and --itself--.
Col. 8, line 64, "315," should be replaced by --316--.

Signed and Sealed this

Thirtieth Day of May, 1995

Attest:

BRUCE LEHMAN

Attesting Officer

Commissioner of Patents and Trademarks